(12) United States Patent
Marupaduga et al.

(10) Patent No.: US 9,451,501 B2
(45) Date of Patent: Sep. 20, 2016

(54) WIRELESS ACCESS NODE AND METHOD FOR SIGNALING AGGREGATION OF A PLURALITY OF UE DEVICES THROUGH A HUB UE DEVICE

(71) Applicant: Sprint Communications Company L.P., Overland Park, KS (US)

(72) Inventors: Sreekar Marupaduga, Overland Park, KS (US); Rajveen Narendran, Olathe, KS (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 137 days.

(21) Appl. No.: 14/061,858

(22) Filed: Oct. 24, 2013

(65) Prior Publication Data

US 2015/0117193 A1    Apr. 30, 2015

(51) Int. Cl.
*H04W 28/08* (2009.01)
*H04W 76/02* (2009.01)
*H04W 88/04* (2009.01)

(52) U.S. Cl.
CPC ......... *H04W 28/085* (2013.01); *H04W 76/023* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 8,879,980 | B2 * | 11/2014 | Bienas | H04W 24/00 455/11.1 |
| 8,995,956 | B2 * | 3/2015 | Lavi | H04W 84/22 343/711 |
| 2009/0088070 | A1 * | 4/2009 | Aaron | H04W 72/085 455/7 |
| 2010/0167743 | A1 | 7/2010 | Palanki et al. | |
| 2011/0117907 | A1 | 5/2011 | Hooli et al. | |
| 2011/0194485 | A1 | 8/2011 | Horneman et al. | |
| 2012/0213183 | A1 | 8/2012 | Chen et al. | |
| 2012/0258703 | A1 | 10/2012 | Hakola et al. | |
| 2012/0320818 | A1 * | 12/2012 | Yang | H04L 5/001 370/315 |
| 2013/0070664 | A1 * | 3/2013 | Nagata | H04B 7/15542 370/315 |
| 2013/0114472 | A1 * | 5/2013 | Tamaki | H04L 1/1854 370/280 |
| 2014/0334371 | A1 * | 11/2014 | Kim | H04W 52/0206 370/311 |

OTHER PUBLICATIONS

Christian Hoymann, et al.; "Multihop Communication in Relay Enhanced IEEE 802.16 Networks;" 17th Annual IEEE International Symposium on Personal, Indoor and Mobile Radio Communications (PIMRC'06); Sep. 1, 2006; 4 pages; Aachen University, Germany.

NEC Group; "D2D Evaluation Scenarios," 3GPP TSG RAN WG1 Meeting #72bis; Apr. 15-19, 2013; 7 pages; R1-131271; Chicago, U.S.A.

* cited by examiner

*Primary Examiner* — Derrick Ferris
*Assistant Examiner* — Jay Vogel (57) ABSTRACT

A wireless access node and method for performing signaling aggregation for a plurality of User Equipment devices (UEs) through a hub UE are provided. The wireless access node in one example includes a communication transceiver configured to allocate traffic channels and signaling channels between the wireless access node and the plurality of UEs and a processing system configured to determine whether a signaling load exceeds a predetermined signaling load threshold, if the signaling load exceeds the predetermined signaling load threshold, then select a hub UE from among the plurality of UEs, with remaining UEs comprising one or more secondary UEs, allocate a plurality of traffic channels between the wireless access node and the hub UE, and relay all signaling for the one or more secondary UEs through the hub UE via signaling aggregation using one or more traffic channels of the plurality of traffic channels.

20 Claims, 6 Drawing Sheets

WIRELESS ACCESS NODE AND METHOD FOR SIGNALING AGGREGATION OF A PLURALITY OF UE DEVICES THROUGH A HUB UE DEVICE

TECHNICAL BACKGROUND

The immense growth in cellular communications requires that wireless infrastructure be used as intelligently as possible. Newer wireless access networks, such as Long Term Evolution (LTE) wireless access networks, are designed to use bandwidth more efficiently and to more efficiently conduct communications. In LTE, a wireless User Equipment (UE) can be allocated a traffic channel and a signaling channel by a wireless access node, wherein the UE can exchange both signaling and communications with the wireless access node. For a communication from a wireless access node to individual UEs, LTE uses Orthogonal Frequency-Division Multiple Access (OFDMA) digital modulation. In OFDMA, subsets of sub-carriers are assigned to individual UEs, allowing simultaneous low data rate transmission from several users. As a result, an individual UE can be allocated a time slot and a subcarrier frequency band. For a communication from individual UEs to the wireless access node, LTE employs Single-Carrier Frequency-Division Multiple Access (SC-FDMA) digital modulation.

Carrier aggregation (CA) is a new development in wireless access networks. In carrier aggregation, a UE is allocated multiple traffic channels by a wireless access node and the UE can use the multiple (i.e., aggregated) traffic channels for exchanging higher rate communications with the wireless access node. The multiple traffic channels can be allocated when conditions are favorable. Carrier aggregation can enable higher communication rates between the UE and the wireless access node.

A drawback of carrier aggregation is that the higher communication rates can correspondingly cause higher signaling levels. The increased signaling levels due to carrier aggregation can become a bottleneck, wherein the traffic rates can be limited by the signaling bottleneck.

Overview

A wireless access node and method for performing signaling aggregation for a plurality of User Equipment devices (UEs) through a hub UE are provided. The wireless access node in one example includes a communication transceiver configured to allocate traffic channels and signaling channels between the wireless access node and the plurality of UEs and a processing system configured to determine whether a signaling load exceeds a predetermined signaling load threshold, if the signaling load exceeds the predetermined signaling load threshold, then select a hub UE from among the plurality of UEs, with remaining UEs comprising one or more secondary UEs, allocate a plurality of traffic channels between the wireless access node and the hub UE, and relay all signaling for the one or more secondary UEs through the hub UE via signaling aggregation using one or more traffic channels of the plurality of traffic channels.

DETAILED DESCRIPTION

Figure 1:
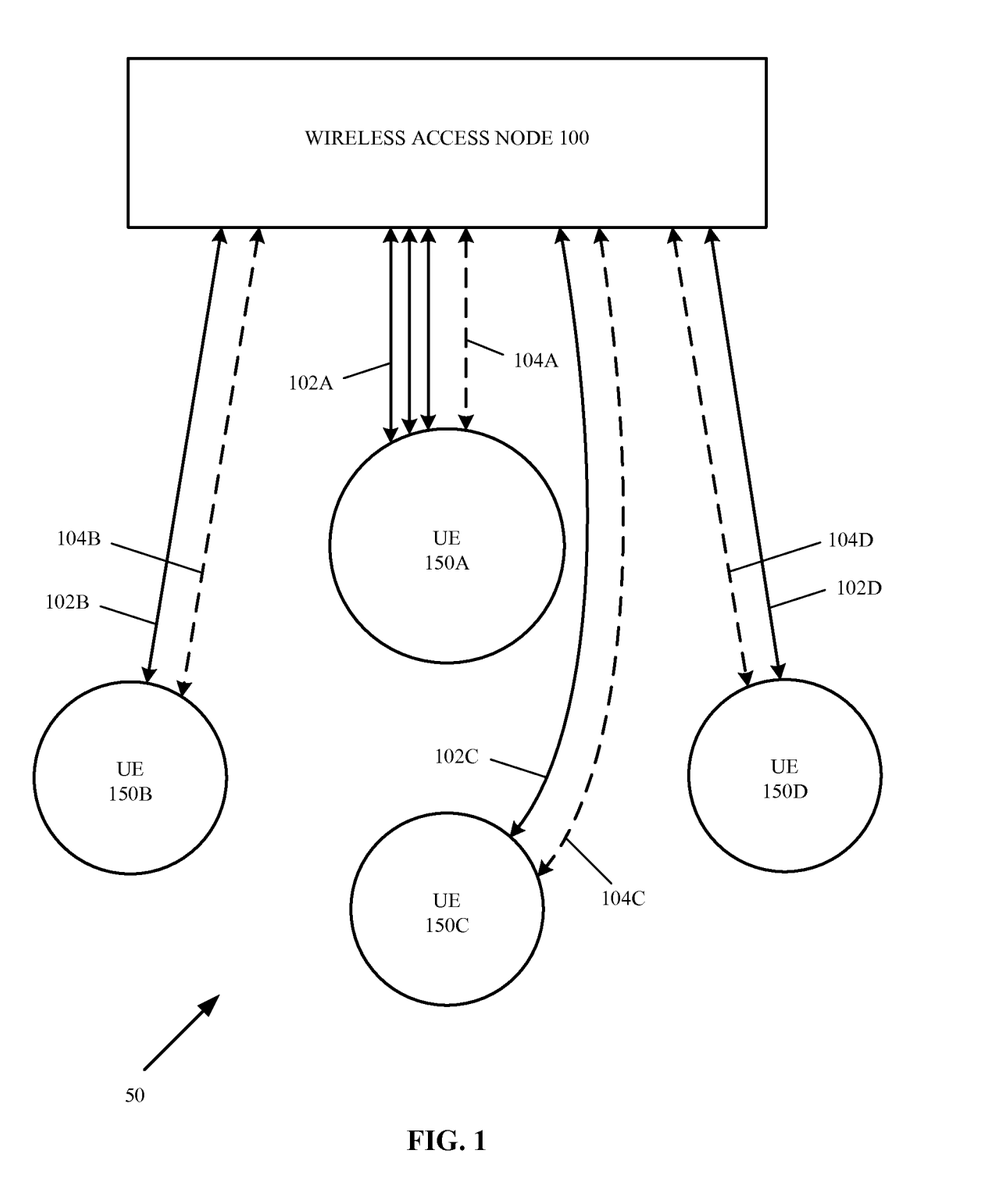
FIG. 1 shows an exemplary wireless communication environment.

FIG. 1 shows an exemplary wireless communication environment 50. The wireless communication environment 50 comprises at least a portion of a wireless access network. The wireless communication environment 50 includes a wireless access node 100 and multiple User Equipment devices (UEs) 150. The wireless access node 100 is connected, wired or wirelessly, to other components and portions of the wireless access network. The wireless access node 100 can be in communication with one or more of the UEs 150. In the example, the wireless access node 100 is in communication with four UEs 150A-150D. The wireless access node 100 has allocated a traffic channel 102 to each UE 150 for carrying message traffic and a signaling channel 104 for carrying signals to and from the UE 150.

The wireless communication environment 50 is configured to perform signaling aggregation with at least some of the UEs 150 that are operating within the region of the wireless access node 100. The wireless communication environment 50 may operate according to any suitable wireless communication protocol, including a Long Term Evolution (LTE) protocol, for example.

The wireless access node 100 and the UEs 150 wirelessly exchange control signaling over the signaling links 104. The control signaling that is transferred over the signaling links 104 has forward components (from the wireless access node 100 to the UEs 150) and reverse components (from the UEs 150 to the wireless access node 100). In response to the control signaling over the signaling links 104 and 204, the wireless access node 100 and the UEs 150 wirelessly exchange communications over the traffic links 102. The communications that are transferred over the traffic links 102 have forward components (from the wireless access node 100 to the UEs 150) and reverse components (from the UEs 150 to the wireless access node 100).

In the case of the UE 150A, the wireless access node 100 has allocated a signaling channel 104 and multiple traffic channels 102. This is termed Carrier Aggregation (CA), where the UE 150A is allocated more than one traffic channel. The CA mode enables a higher traffic rate between the wireless access node 100 and the UE 150A.

A drawback of carrier aggregation is that the higher communication rates can correspondingly cause higher signaling levels. The increased signaling levels due to carrier aggregation can become a bottleneck, wherein the traffic rates can be limited by the signaling bottleneck.

Figure 2:
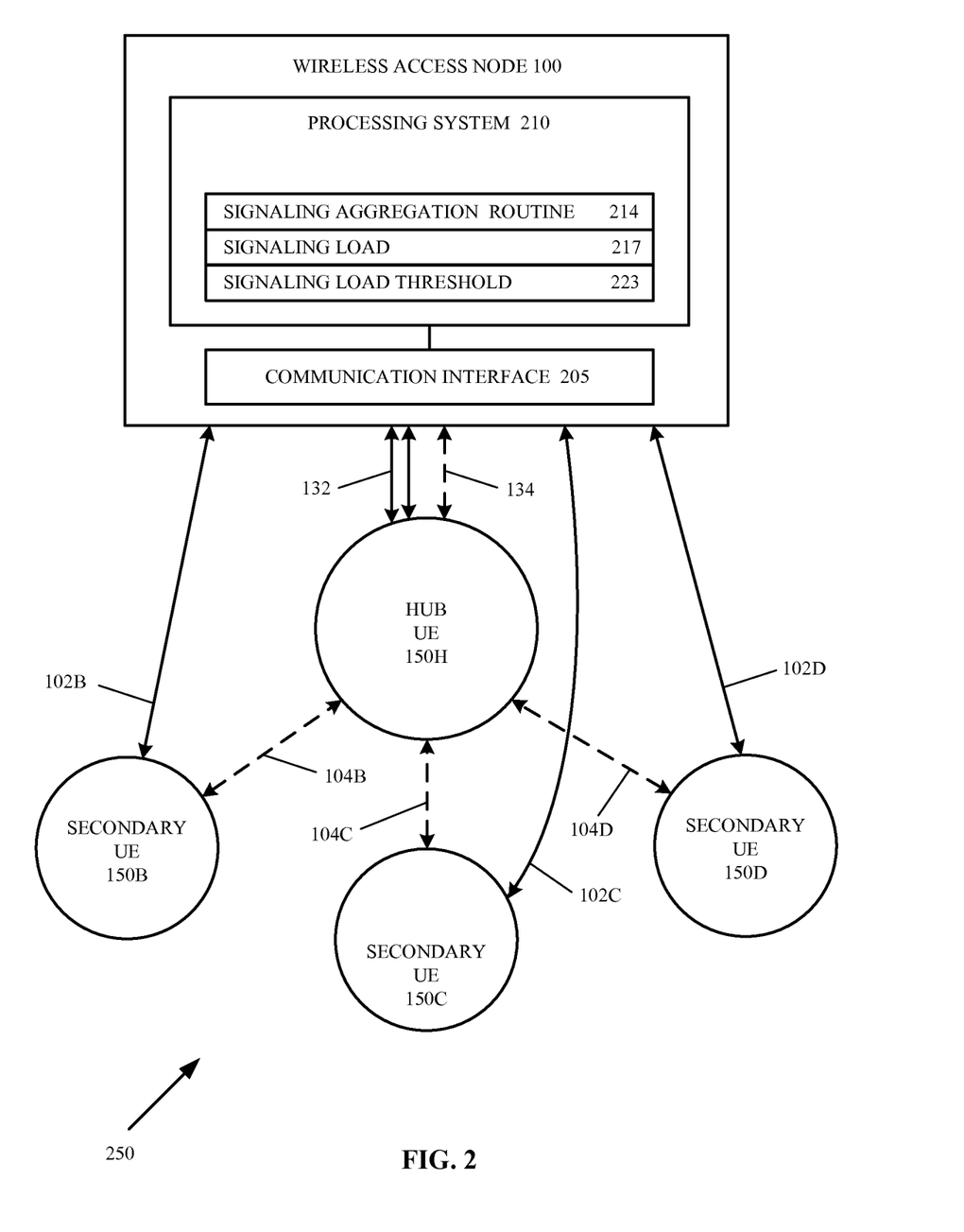
FIG. 2 shows an exemplary wireless access node of a wireless access network configured to perform signaling aggregation for a plurality of User Equipment devices (UEs) through a hub UE.

FIG. 2 shows an exemplary wireless access node 100 of a wireless access network configured to perform signaling aggregation for a plurality of User Equipment devices (UEs) 150 through a hub UE 150H. In the figure, the wireless access node 100 has selected the hub UE 150H. The remaining UEs comprise one or more secondary UEs 150B-150D.

In the figure, the wireless access node 100 has allocated a signaling channel 134 and two traffic channels 132 to the hub UE 150H. However, it should be understood that the wireless access node 100 can allocate any number of traffic channels to the hub UE 150H.

The wireless access node 100 has not allocated any signaling channels to the one or more secondary UEs 150B-150D. In the example shown, the wireless access node 100 has, however, maintained traffic channels 102B-102D to the secondary UEs 150B-150D.

It is desired that the signaling load of the wireless access node 100 be reduced whenever possible. It is desired that the signaling load of the wireless access node 100 not be a bottleneck, especially when a CA mode is implemented for one or more UEs. It is desired that the signaling load of the wireless access node 100 be reduced whenever possible so that the wireless access node 100 can carry traffic more efficiently.

In the example shown, the wireless access node 100 has initiated a signaling aggregation mode for the UEs 150H and 150B-150D. Therefore, there are no signaling channels allocated directly between the wireless access node 100 and the secondary UEs 150B-150D.

In a signaling aggregation mode, all signaling is exchanged between the wireless access node 100 and the hub UE 150H. As a result, the signaling does not need to be individually relayed by the wireless access node 100 to the one or more secondary UEs 150B-150D. The hub UE 150H relays the signaling to the one or more secondary UEs 150B-150D, as appropriate. Signaling from the wireless access node 100 to any of the secondary UEs 150B-150D passes through the hub UE 150H Likewise, signaling from any of the secondary UEs 150B-150D to the wireless access node 100 passes through the hub UE 150H.

The hub UE 150H exchanges aggregated signaling with the wireless access node 100. The hub UE 150H distributes the aggregated signaling to the one or more secondary UEs 150B-150D. Consequently, the hub UE 150H therefore performs some of the processing of the signaling that would have previously been done by the wireless access node 100. Further, the hub UE 150H receives and aggregates signaling from the one or more secondary UEs 150B-150D (and itself) and relays the aggregated signaling to the wireless access node 100.

The wireless access node 100 in the example shown includes a communication interface 205 and a processing system 210 coupled to the communication interface 205. The communication interface 205 is configured to allocate traffic channels and signaling channels between the wireless access node 100 and the plurality of UEs 150. The processing system 210 includes a signaling aggregation routine 214, a signaling load 217, and a signaling load threshold 223. Other routines, values, or data can be included in the processing system 210, but are omitted for clarity.

The signaling aggregation routine 214 performs a signaling aggregation function. The signaling aggregation routine 214 determines whether a signaling aggregation mode is possible. The signaling aggregation routine 214 determines whether a signaling load in the wireless access node 100 is low or high, among other things. The signaling aggregation routine 214 selects a UE 150 to be the hub UE 150H. The signaling aggregation routine 214 allocates traffic channels and switches the plurality of UEs 150 to a signaling aggregation mode.

The hub UE 150H can be selected according to any suitable criteria. The wireless access node 100 can select the hub UE 150H to be the UE that is already in carrier aggregation mode and already has multiple allocated traffic channels (where the carrier aggregation UE can optionally be allocated more traffic channels for the signaling aggregation, if needed). The selected hub UE can be physically closest to the wireless access node 100. The selected hub UE can be substantially geographically centered among the plurality of UEs 150. The selected hub UE can be the closest to the most other UEs. The selected hub UE can have the strongest signal. The selected hub UE can have the best S/N ratio. The selected hub UE can have the least interference. The selected hub UE can create the least interference. The selected hub UE can have the greatest available electrical power overhead (i.e., can operate at higher power outputs if needed). It should be understood that the selection can be based on one or more of the above criteria.

The signaling load 217 comprises a characterization of a signaling load in the wireless access node 100. The signaling load 217 can include a current number of UEs associated with the wireless access node 100, a current number of UEs communicating with the wireless access node 100, a signaling load quantification (including an instantaneous signaling load level, an average signaling load level, or any other suitable signaling load representation), an interference quantification, a noise quantification, or combinations thereof.

The signaling load threshold 326 comprises a predetermined threshold that is used to determine if the signaling load is acceptable or unacceptable. If the signaling load 217 is less than the signaling load threshold 223, then it is determined that the signaling load is low and the wireless access node 100 therefore does not need to switch to a signaling aggregation mode. If the signaling load 217 exceeds the signaling load threshold 223, then it is determined that the signaling load is high and the wireless access node 100 should switch to a signaling aggregation mode, if possible.

In some examples, the signal aggregation routine 214 when executed by the wireless access node 100 in general or the processing system 210 in particular operates to direct the wireless access node 100 or the processing system 210 to determine whether a signaling load 217 exceeds a predetermined signaling load threshold 223, if the signaling load 217 exceeds the predetermined signaling load threshold 223, then select a hub UE 150H from among the plurality of UEs 150, with remaining UEs comprising one or more secondary UEs 150B-150D, allocate a plurality of traffic channels 132 between the wireless access node 100 and the hub UE 150H, and relay all signaling for the one or more secondary UEs 150B-150D through the hub UE 150H vial signaling aggregation using one or more traffic channels of the plurality of traffic channels 132.

The carrier aggregation (CA) of multiple traffic channels 132 is employed for signaling aggregation by allocating the plurality of traffic channels 132 between the wireless access node 100 and the hub UE 150H, wherein one or more traffic channels of the plurality of traffic channels 132 are used for the signaling aggregation.

The processing system 210 can be further configured to determine whether a carrier aggregation (CA) mode is active for the hub UE 150H and can initiate the CA mode in the hub UE 150H if the CA mode is not already active.

The hub UE 150H is selected according to one or more of being physically closest to the wireless access node 100, being substantially geographically centered among the plurality of UEs 150, being closest to the most other UEs, having the strongest signal, having the best S/N ratio, having the least interference, creating the least interference, or having the greatest available power overhead.

The signaling load 217 comprises one or more of a current number of UEs associated with the wireless access node 100, a current number of UEs communicating with the wireless access node 100, a signaling load quantification, an interference quantification, or a noise quantification.

Some or all of the signaling being relayed can be relayed over the one or more traffic channels being used in the signaling aggregation mode. In some examples, all of the signaling relayed between the wireless access node 100 and the hub UE 150H is communicated over the traffic channels that are used in the signaling aggregation mode. Alternatively, at least a portion of the signaling can be relayed via the signaling channel 134 allocated between the wireless access node 100 and the hub UE 150H.

Figure 3:
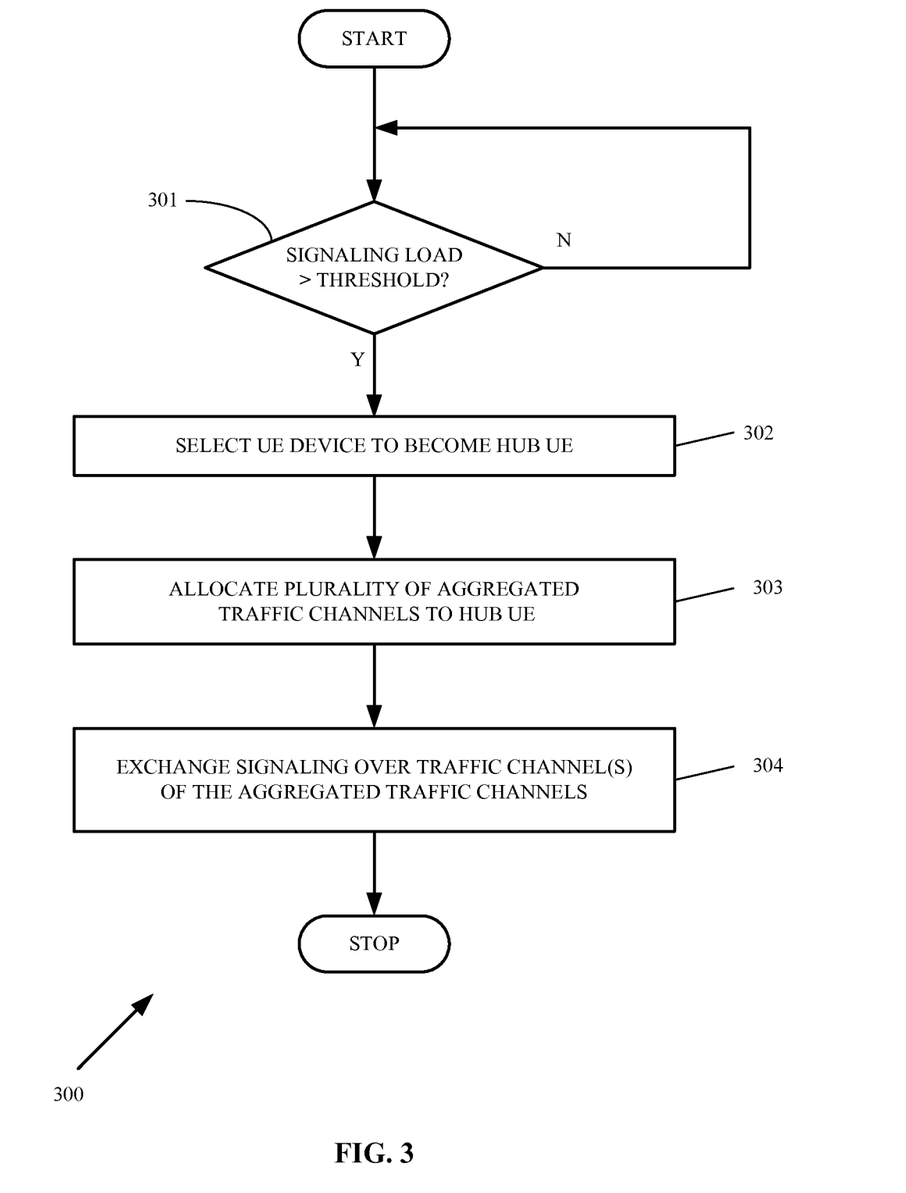
FIG. 3 is a flowchart of an exemplary signaling aggregation method for a wireless access node of a wireless access network.

FIG. 3 is a flowchart 300 of an exemplary signaling aggregation method for a wireless access node of a wireless access network. The signaling aggregation aggregates the signaling for a plurality of UEs, relaying the signaling through a hub UE. In step 301, the wireless access node determines whether a signaling load exceeds a predetermined signaling load threshold. If the signaling load is less than the predetermined signaling load threshold, then the method loops back and waits. If the signaling load exceeds the predetermined signaling load threshold, then the method proceeds to step 302.

In step 302, where the signaling load exceeds the signaling load threshold, the wireless access node selects a particular candidate UE to be the hub UE. All other UEs to be involved in the aggregate signaling (i.e., the remaining UEs) comprise secondary UEs. The hub UE will exchange aggregated signaling with the wireless access node, will process the signaling, and will distribute the aggregated signaling to the secondary UEs, as previously discussed. The hub UE will include its own signaling in the aggregate signaling, along will all signaling directed to or received from the secondary UEs.

In step 303, the wireless access node allocates a plurality of traffic channels to the hub UE. In addition, or alternatively, the wireless access node can allocate a single signaling channel to the hub UE (not shown). At least some of the traffic channels can be used for exchanging signaling between the wireless access node and the hub UE.

In step 304, the wireless access node exchanges signaling with the hub UE using one or more traffic channels of the aggregated traffic channels allocated between the wireless access node and the hub UE. It should be understood that in some examples the signaling exchanged over the one or more traffic channels is in addition to the signaling channel allocated between the wireless access node and the hub UE. As a consequence, all signaling travels through the hub UE.

Figure 4:
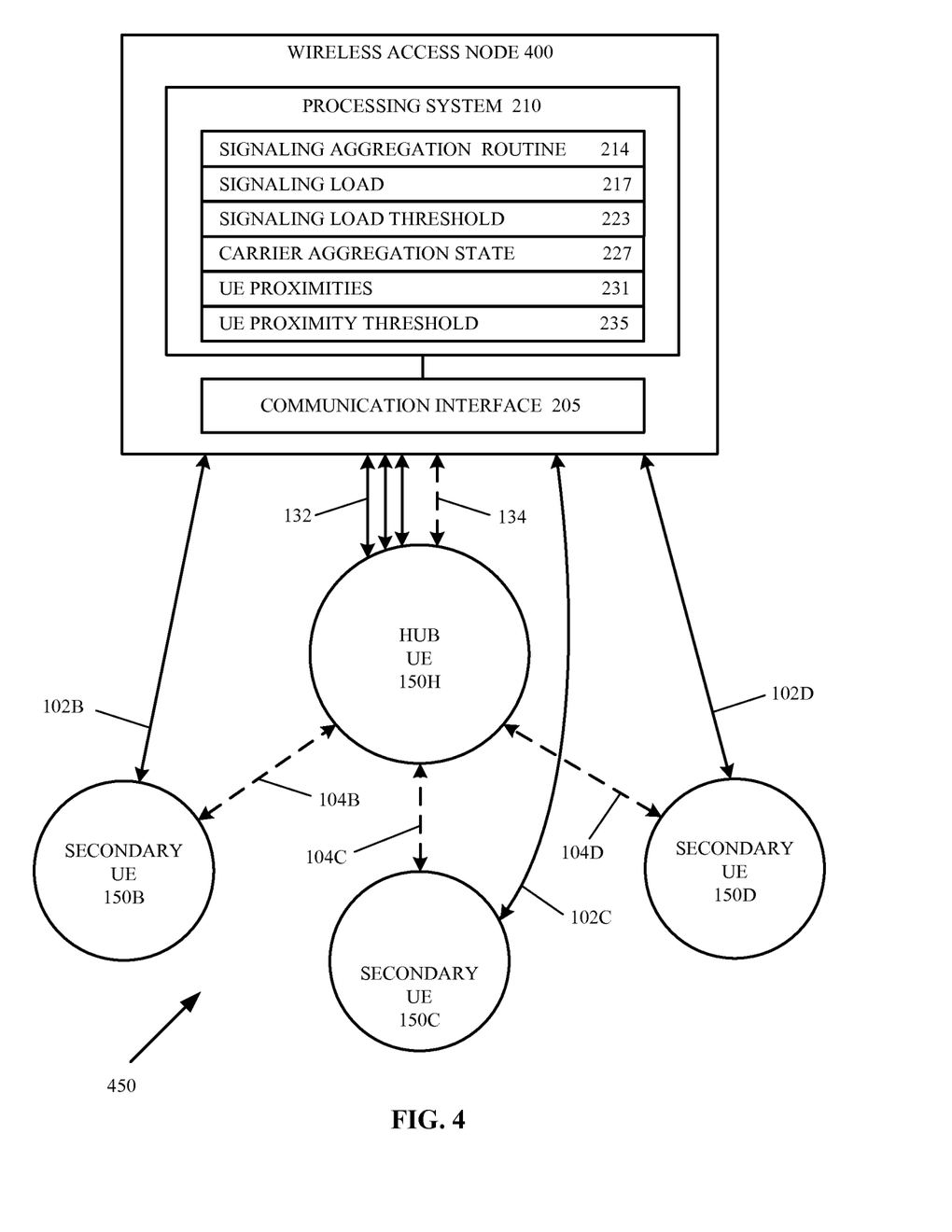
FIG. 4 shows another exemplary wireless access node configured to perform signaling aggregation.

FIG. 4 shows another exemplary wireless access node 400 configured to perform signaling aggregation in a wireless communication environment 450. The wireless access mode 400 of FIG. 4 is an example of the wireless access node 100 of FIG. 2. However, the wireless access node 100 of FIG. 2 may be the same or different from the wireless access node 400 of FIG. 4. In this figure, the processing system 210, in addition to the previously recited routines, values, and information, includes a carrier aggregation state 227, a set of UE proximities 231, a UE proximity threshold 235, and a hub UE 242.

In the figure, the wireless access node 400 has allocated a signaling channel 134 to the hub UE 150H and three traffic channels 132. However, it should be understood that the wireless access node 400 can allocate any number of traffic channels to the hub UE 150H.

The signaling aggregation routine 231, in addition to the previously recited operations, can determine if carrier aggregation is already being performed. The signaling aggregation routine 231 can implement signaling aggregation if a UE or UEs are currently in a carrier aggregation mode. The signaling aggregation routine 231 can implement carrier aggregation if signaling aggregation is about to be implemented (such as where the UE for carrier aggregation would also be suitable for signaling aggregation). The signaling aggregation routine 231 can initiate signaling aggregation in a selected hub UE 150H, wherein carrier aggregation is needed as a pre-requisite for signaling aggregation (i.e., carrier aggregation must be performed in the hub UE 150H before the hub UE 150H can be put into a signaling aggregation mode). Further the signaling aggregation routine 231 can determine whether to switch to signaling aggregation, depending on whether the UEs 150 are sufficiently proximate to each other. If the UEs 150 are not sufficiently proximate to each other, then the UEs 150 may not be able to successfully or reliably exchange signaling.

The carrier aggregation state 227 comprises a true or false state indication of whether carrier aggregation currently exists (i.e., whether the wireless access node 400 has allocated multiple traffic channels to the hub UE 150H). If the carrier aggregation state 227 is set to true, then the wireless access node 400 has allocated multiple traffic channels to the hub UE 150H and a carrier aggregation mode is currently being performed.

The UE proximities 231 comprise proximity values or quantifications for candidate UEs that are being considered for signaling aggregation. The UE proximities 231 can comprise any manner of proximity quantification, including physical distances, signal measurements, or any other suitable values that can be used to determine whether candidate UEs are suitable for signaling aggregation.

In some examples, the UE proximities 231 can be obtained through signal strength measurements performed by the wireless access node 400 and/or the UEs. The UE proximities 231 can be obtained through CQI values obtained from the UEs. The UE proximities 231 can be obtained as a signal-to-noise (S/N) ratio measured by one or more of the UEs. The UE proximities 231 can be obtained as the wireless access node 400 requesting location information from the UEs. The UE proximities 231 can be obtained as the wireless access node 400 determining locations of the UEs based on triangulation using information obtained from other, neighboring wireless access nodes. The UE proximities 231 can be obtained as the wireless access node 400 determining the distance and angle to the UEs. The UE proximities 231 can be obtained as the wireless access node 400 obtaining GPS information for the UEs and using the GPS information to determine the locations of the UEs.

The UE proximity threshold 235 comprises a predetermined proximity threshold that is used to determine whether candidate UEs are within proximity of each other. Alternatively, or in addition, the UE proximity threshold 235 comprises a predetermined proximity threshold that is used to determine whether candidate UEs are within proximity of a candidate hub UE.

The UE proximity threshold can comprise a candidate UE being within a predetermined geographic area. The UE proximity threshold can comprise a candidate UE being within a maximum distance from other UEs (or from a hub UE). The UE proximity threshold can comprise a candidate UE having a signal strength above a minimum signal strength threshold. The UE proximity threshold can comprise a candidate UE having an interference level below a maximum interference threshold. The UE proximity threshold can comprise a candidate UE having a Channel Quality Indicator (CQI) value above a minimum CQI threshold. The UE proximity threshold can comprise a candidate UE having a signal-to-noise (S/N) ratio above a minimum S/N threshold.

If the UEs 150 are in a sub-region of the coverage area of the wireless access node 400, and are within proximity of each other, then the UEs 150 are candidates for a signaling aggregation mode. The UEs 150 must be proximate each other in order to communicate directly, without communications needing to be relayed through the wireless access node 400.

The wireless access node 400 uses the UE proximities 231 and the UE proximity threshold 235 to determine whether the candidate UEs 150 available for inclusion in a signaling aggregation mode are within proximity of each other. The wireless access node 400 compares the UE proximities 231 to the UE proximity threshold 235. If a particular UE proximity value for a particular candidate UE 150 is within the UE proximity threshold 235, then the particular candidate UE 150 is determined to be within an acceptable proximity and the particular candidate UE 150 is included in the signaling aggregation mode. If the particular UE proximity value exceeds the UE proximity threshold 235, then the particular candidate UE 150 is determined to be outside of an acceptable proximity and is not included in the signaling aggregation mode. Each candidate UE 150 can be processed in this manner, wherein some, all, or none of the candidate UEs 150 may be accepted for a signaling aggregation mode. Candidate UEs 150 are winnowed out if not within sufficient proximity to communicate reliably with each other.

The hub UE 150H can be selected according to any suitable criteria. The wireless access node 400 can select the hub UE 150H to be the UE that is already in carrier aggregation mode and already has multiple allocated traffic channels (where the carrier aggregation UE can optionally be allocated more traffic channels for the signaling aggregation, if needed). The selected hub UE can be physically closest to the wireless access node 400. The selected hub UE can be substantially geographically centered among the plurality of UEs 150. The selected hub UE can be the closest to the most other UEs. The selected hub UE can have the strongest signal. The selected hub UE can have the best S/N ratio. The selected hub UE can have the least interference. The selected hub UE can create the least interference. The selected hub UE can have the greatest available electrical power overhead (i.e., can operate at higher power outputs if needed). It should be understood that the selection can be based on one or more of the above criteria.

In some examples, the signal aggregation routine 214 when executed by the wireless access node 400 in general or the processing system 210 in particular operates to direct the wireless access node 400 or the processing system 210 to determine whether a signaling load 217 exceeds a predetermined signaling load threshold 223, if the signaling load 217 exceeds the predetermined signaling load threshold 223, then obtain UE proximities 231 for the plurality of UEs 150A-150D, compare the UE proximities 231 to a predetermined UE proximity threshold 235, retain UEs in the signaling aggregation mode having UE proximities 231 that do not exceed the predetermined UE proximity threshold 235, select a hub UE 150H from among the plurality of UEs 150, with remaining UEs comprising one or more secondary UEs 150B-150D, allocate a plurality of traffic channels 132 between the wireless access node 400 and the hub UE 150H, and relay all signaling for the one or more secondary UEs 150B-150D through the hub UE 150H using one or more traffic channels of the plurality of traffic channels 132.

Figure 5:
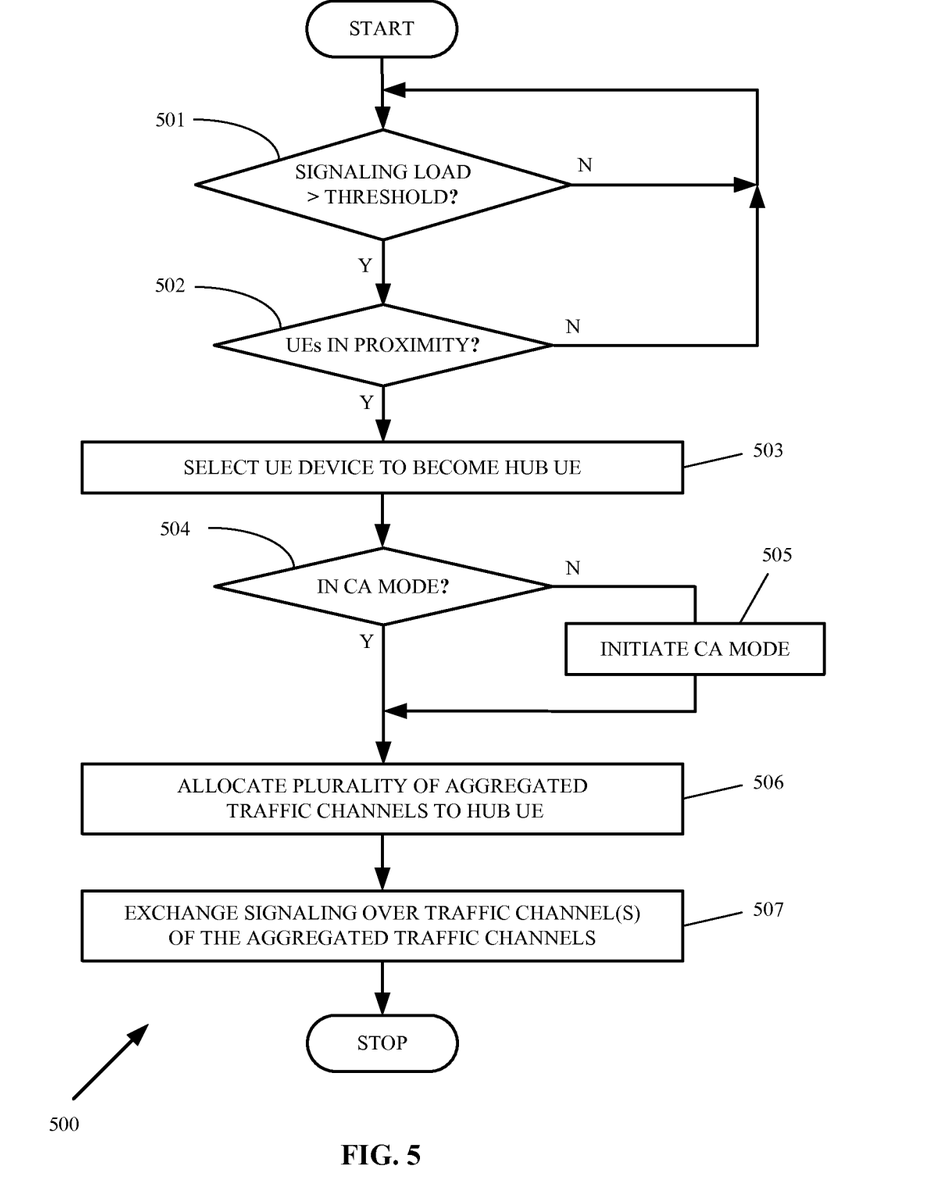
FIG. 5 is a flowchart of another exemplary signaling aggregation method for a wireless access node of a wireless access network.

FIG. 5 is a flowchart 500 of an exemplary signaling aggregation method for a wireless access node of a wireless access network. The signaling aggregation aggregates the signaling for a plurality of UEs, relaying the signaling through a hub UE. In step 501, the wireless access node determines whether a signaling load exceeds a predetermined signaling load threshold, as previously discussed. If the signaling load is less than the predetermined signaling load threshold, then the method loops back to step 501. If the signaling load exceeds the predetermined signaling load threshold, then the method proceeds to step 502.

In step 502, the wireless access node determines whether the candidate UEs available for inclusion in a signaling aggregation mode are within proximity of each other. The proximity determination comprises an iterative determination of proximity for each candidate UE. If proximate candidate UEs are found, then the method proceeds to step 503. Otherwise, where no proximate candidate UEs are found, the method loops back to step 501.

The wireless access node obtains UE proximities, as previously discussed. The wireless access node compares the UE proximities to a UE proximity threshold, and retains UEs in the signaling aggregation mode having UE proximities that do not exceed the predetermined UE proximity threshold, as previously discussed. If a particular UE proximity value for a particular candidate UE is within the UE proximity threshold, then the particular candidate UE is determined to be within an acceptable proximity and the particular candidate UE is included in the signaling aggregation mode. If the particular UE proximity value exceeds the UE proximity threshold, then the particular candidate UE is determined to be outside of an acceptable proximity and the particular candidate UE is not included in the signaling aggregation mode. Each candidate UE can be processed in this manner, wherein some, all, or none of the candidate UEs may be accepted for a signaling aggregation mode. The candidate UEs are winnowed out if not within sufficient proximity to communicate reliably with each other.

In step 503, the wireless access node selects a particular candidate UE to be the hub UE, as previously discussed. The wireless access node selects the hub UE where the signaling load exceeds the signaling load threshold, where a carrier aggregation mode already exists, and where the candidate UEs are proximate to each other (and/or to the hub UE). All other candidate UEs that satisfy the proximity criterion (i.e., the remaining UEs) comprise the one or more secondary UEs, as previously discussed.

In step 504, the wireless access node determines whether a carrier aggregation mode is active. If no carrier aggregation mode is active, the method branches to step 505. If a carrier aggregation mode is active, then the method proceeds to step 506. Therefore, in this example, the signaling aggregation (i.e., the allocation of multiple traffic channels to a UE for conveying multiple signaling instances) is performed only if carrier aggregation (i.e., the allocation of multiple traffic channels to a UE for conveying multiple communication instances) is being performed.

In step 505, where carrier aggregation is currently not active in the selected hub UE, the wireless access node initiates a carrier aggregation mode in the hub UE. The carrier aggregation mode will allocate a plurality of traffic channels to the hub UE, wherein one or more traffic channels of the allocated plurality of CA traffic channels can be used for signaling aggregation.

In step 506, the wireless access node allocates a plurality of traffic channels to the hub UE for signaling aggregation, as previously discussed.

In step 507, the wireless access node exchanges signaling with the hub UE using one or more traffic channels of the aggregated traffic channels allocated between the wireless access node and the hub UE, as previously discussed. The hub UE exchanges aggregated signaling with the wireless access node, processes the signaling, and distributes the aggregated signaling to the one or more secondary UEs, as previously discussed. The hub UE includes its own signaling in the aggregate signaling, along with all signaling directed to or received from the one or more secondary UEs.

Figure 6:
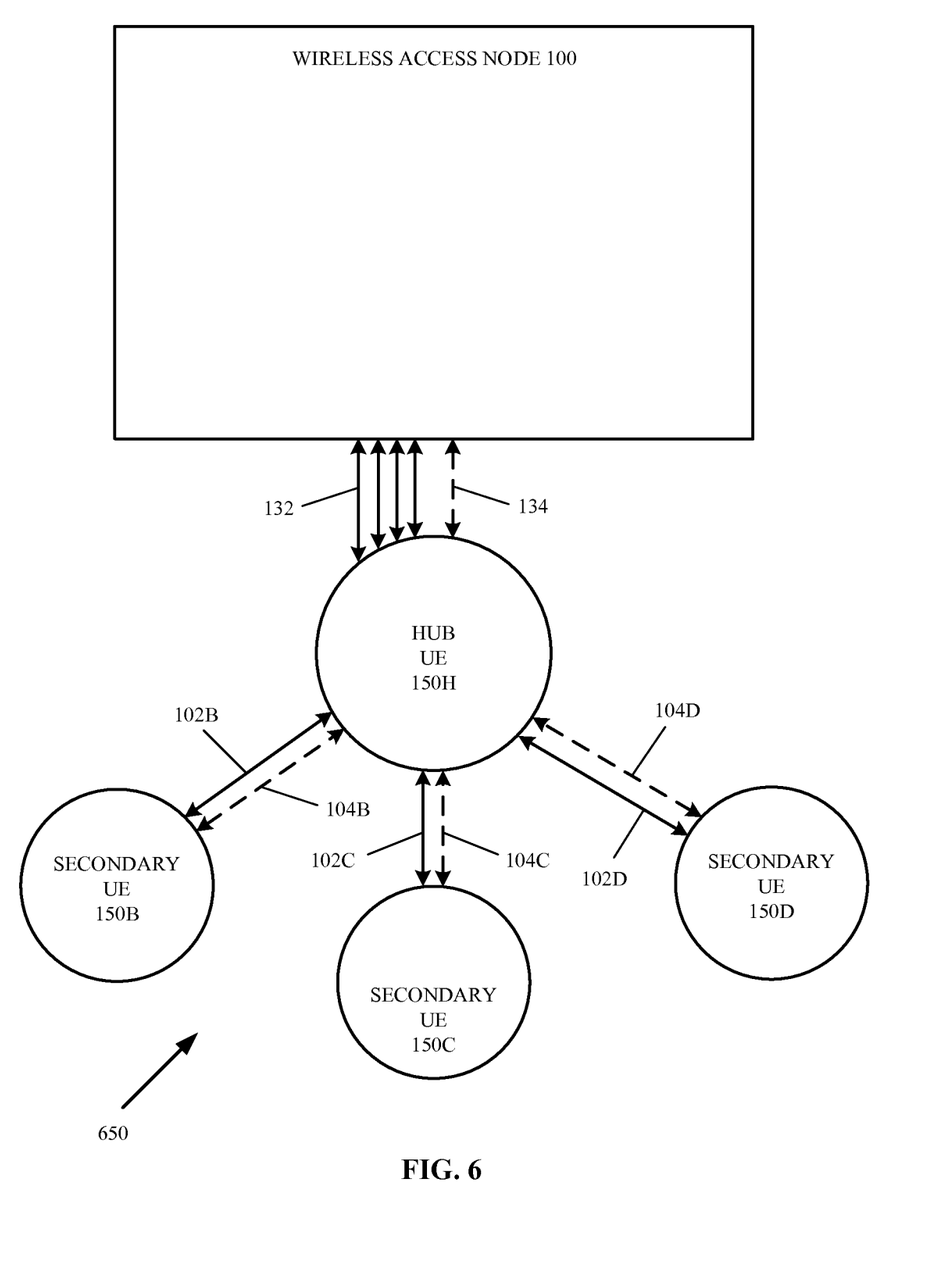
FIG. 6 shows yet another exemplary wireless access node configured to perform signaling aggregation.

FIG. 6 shows yet another exemplary wireless access node 100 configured to perform signaling aggregation. The wireless access node 100 in this figure can be implemented as the wireless access node 100 in FIG. 2 or can be implemented as the wireless access node 400 in FIG. 4. This figure differs in that the secondary UEs 150B-150D no longer have independent and individual allocated traffic channels directly to the wireless access node 100 or 400. Instead, in this example, each secondary UE 150B, 150C, or 150D of a wireless communication environment 650 has a traffic channel 102B, 102C, or 102D allocated between it and the hub UE 150H. As a result, all signaling and all communications are relayed through the hub UE 150H.

Referring to any of FIGS. 1, 2, 4, and 6, the wireless communication environment in the examples can provide communication services including voice calls, text messages, data access, or other communication services provided over cellular or wireless communication networks. In some examples, the wireless communication environment includes equipment to provide wireless access to communication services within different coverage areas to user devices, route communications between content providers and user devices, and facilitate handoffs between equipment of different coverage areas, among other operations.

The wireless communication environment can include one or more wireless access nodes. The one or more wireless access nodes may be coupled together by communication links. The one or more wireless access nodes may be further coupled to other devices or networks, including telephone landlines or Internet links, for example. As a result, communications exchanged between the UEs and the wireless access node may be further provided to other devices within the wireless communication environment.

Referring to any of FIGS. 1, 2, 4, and 6, the wireless communication environment comprises a LTE, LTE Advanced, or Evolved Universal Terrestrial Radio Access (EUTRA) wireless access network in some examples. The wireless access network can comprise a High Rate Packet Data (HRPD) or an evolved High Rate Packet Data (eH-RPD) network, a Global System for Mobile communications (GSM) network, a Universal Mobile Telecommunications System (UMTS) network, a Code Division Multiple Access (CDMA) network, an Enhanced Voice-Data Optimized (EV-DO) network, a single-carrier radio transmission technology link (1xRTT) network, a High Speed Packet Access (HSPA) network, a Radio Link Protocol (RLP) network, a Worldwide Interoperability for Microwave Access (WiMAX) network, an Orthogonal Frequency-Division Multiple Access (OFDMA) network, a Single-carrier frequency-division multiple access (SC-FDMA) network, a Wideband Code Division Multiple Access (W-CDMA) network, a Time Division Synchronous Code Division Multiple Access (TD-SCDMA) network, an IEEE 802.11 network, a Wireless Fidelity (Wi-Fi) network, or some other cellular or wireless communication format, including combinations, improvements, or variations thereof. However, the above examples are illustrative and are not exhaustive. Other wireless access networks are contemplated and are within the scope of the description and claims. Further, the examples above apply equally well to improvements and enhancements of current wireless access networks.

Referring to any of FIGS. 1, 2, 4, and 6, the wireless access node in the examples includes processing equipment, routing equipment, physical structures, and can also include transceiver equipment, antenna equipment, and other equipment. The wireless access node includes at least one transceiver and antenna for exchanging wireless communications with UEs in a particular sector of wireless coverage. It should be understood that the wireless access node could be distributed or consolidated among equipment or circuitry that together forms the elements of the wireless access node. Further equipment, networks, and systems can be communicatively coupled to the wireless access node, such as equipment, networks, and systems of cellular voice and data communication systems, but are omitted from the figures for clarity.

The wireless access node in the examples provides one or more wireless links in a cell or cell sector of wireless coverage in some examples. The wireless access node is capable of communicating with the UEs, and may be capable of communicating using a variety of frequencies and a variety of communication schemes. A wireless access node can provide one or more wireless links in some embodiments. A wireless access node can provide a sector of wireless coverage in some embodiments. Any number of wireless access nodes can be included in the wireless communication environment.

The wireless access node in the examples can include elements such as radio access network (RAN) equipment, eNodeB equipment, Mobility Management Entity (MME) equipment, Home Subscriber Servers (HSS), Evolved Universal Terrestrial Radio Access (E-UTRA) network equipment, a base station (BS), a base transceiver station (BTS), a base station controller (BSC), a mobile switching center (MSC), a home location register (HLR), a radio node controller (RNC), a call processing system, authentication, authorization and accounting (AAA) equipment, an access service network gateway (ASN-GW), a packet data switching node (PDSN), a home agent (HA), a mobility access gateway (MAG), an Internet access node, a telephony service node, a database, or other communication and control equipment.

The UEs and the wireless access node comprise communication circuitry and software to support one or more wireless protocols, such as LTE, CDMA, GSM, EVDO, and HSPA. The UEs and the wireless access node typically also comprise communication circuitry and software to support one or more data protocols, such as IP, Ethernet, packet voice, and the like. The wireless access node may have backhaul connectivity to one or more core networks over various wired and/or wireless data connections.

Referring to any of FIGS. 1, 2, 4, and 6, the UEs can comprise a mobile device, including a cellular phone, but also may include other devices. The UEs can comprise subscriber equipment, customer equipment, an access terminal, a smartphone, a telephone, a mobile wireless telephone, a personal digital assistant (PDA), a computer, an e-book, a mobile Internet appliance, a wireless network interface card, a media player, a game console, or some other wireless communication apparatus, including combinations thereof. The UEs may be integrated within other systems and devices, such as vehicles, appliances, apparel, and the like. The UEs detect and report various system conditions to the wireless access node, such as inter-cell interference and failed signaling access.

The UEs in the examples receive wireless access to communication services through the wireless access node. The communication services can include voice calls, text messaging, data exchange, multimedia streaming, and the like. The UEs can include one or more transceiver portions for communication over one or more wireless links of differing frequency bands. The UEs can receive wireless access information from one or more wireless access nodes, such as beacon signals, channel information, frequency information, overhead signaling, neighbor lists, and the like. The UEs can move among any of the coverage areas associated with the wireless communication environment and receive wireless access.

Referring to any of FIGS. 1, 2, 4, and 6, the communication interface in the examples comprises a network card, network interface, port, or interface circuitry that allows the wireless access node to communicate with other communication devices over a variety of networks. The communication interface may also include a memory device, software, processing circuitry, or some other device. The communication interface may use various communication protocols, such as time division multiplex, internet, Ethernet, wireless, or some other communication format—including combinations thereof—to exchange communications as described herein for communication devices, such as anonymity factor and changes to the anonymity factor and mobility data.

The communication interface in the examples comprises an interface for communicating with one or more UEs. The communication interface receives command and control information and instructions from the processing system (for controlling the operations of the communication interface and the UEs over wireless links, coordinating handoffs of the UEs between other wireless access systems, exchanging authentication or authorization information with other wireless access networks, providing parameters to one or more UEs, transferring neighbor list information, and transferring communications for delivery to a UE. The wireless link can use various protocols or communication formats as described herein, including combinations, variations, or improvements thereof.

The communication interface in the examples includes transceiver equipment for wirelessly exchanging user communications and overhead communications with user devices, omitted for clarity, using antenna arrays and the associated wireless links. The communication interface can include one or more antenna elements, RF coupling equipment, structural supports, cabling, or other equipment.

The processing system in the examples can comprise one or more microprocessors and other circuitry that retrieves and executes the signaling aggregation routine. The processing system can be implemented within a single processing device but can also be distributed across multiple processing devices or sub-systems that cooperate in executing program instructions. Examples of the processing system include general purpose central processing units, application specific processors, and logic devices, as well as any other type of processing device, combinations, or variations thereof. In some examples, the processing system includes a computer readable storage media capable of storing the signaling aggregation routine. The processing system can include volatile and nonvolatile, removable and non-removable media implemented in any method or technology for storage of information, such as computer readable instructions, data structures, program modules, or other data.

In addition to storage media, in the examples the processing system can also include communication media over which the signaling aggregation routine can be communicated. The processing system can be implemented to include a single storage device but can also be implemented to include multiple storage devices or sub-systems co-located or distributed relative to each other. The processing system can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In general, the signaling aggregation routine can, when loaded into the processing system and executed, transform the processing system into a special-purpose computing system configured to perform a switch to a signaling aggregation mode, among other operations. Encoding the signaling aggregation routine on the processing system can transform the physical structure of the processing system. The specific transformation of the physical structure can depend on various factors in different implementations of this description. Examples of such factors can include, but are not limited to the technology used to implement the storage media of the processing system and whether the computer-storage media are characterized as primary or secondary storage. For example, if the computer-storage media are implemented as semiconductor-based memory, the signaling aggregation routine can transform the physical state of the semiconductor memory when the program is encoded therein. For example, the signaling aggregation routine can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The signaling aggregation routine in the examples comprises computer programs, firmware, or some other form of machine-readable processing instructions. The signaling aggregation routine may include an operating system, utilities, drivers, network interfaces, applications, virtual machines, or some other type of software. The signaling aggregation routine can include additional processes, programs, or components, such as operating system software, database software, or application software. The signaling aggregation routine can also comprise firmware or some other form of machine-readable processing instructions executable by the processing system.

The signaling aggregation routine in the examples can include additional processes, programs, or components, such as operating system software, database software, or application software. The signaling aggregation routine can also comprise firmware or some other form of machine-readable processing instructions executable by the processing system.

Many aspects of the disclosure can be better understood with reference to the drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A wireless access node of a wireless access network configured to aggregate signaling for a plurality of User Equipment (UE) devices (UEs), the wireless access node comprising:
   a communication transceiver configured to allocate traffic channels and signaling channels between the wireless access node and the plurality of UEs, wherein the wireless access node and the plurality of UEs wirelessly exchange control signaling over the signaling channels and communication traffic over the traffic channels, the control signaling being separate and distinct from the communication traffic; and
   a processing system coupled to the communication transceiver and configured to determine whether a signaling load associated with the control signaling exceeds a predetermined signaling load threshold, if the signaling load associated with the control signaling exceeds the predetermined signaling load threshold, then select a hub UE from among the plurality of UEs, with remaining UEs of the plurality of UEs comprising one or more secondary UEs, determine whether a carrier aggregation mode is active for the hub UE and if the carrier aggregation mode is not active for the hub UE, initiate the carrier aggregation mode for the hub UE by allocating multiple traffic channels of the traffic channels to the hub UE, exchange the communication traffic associated with the hub UE over at least one of the multiple traffic channels allocated to the hub UE, relay all of the control signaling associated with the one or more secondary UEs through the hub UE via signaling aggregation using one or more of the multiple traffic channels allocated to the hub UE, and exchange the communication traffic associated with the one or more secondary UEs over the traffic channels allocated to the one or more secondary UEs.

2. The wireless access node of claim 1, wherein the wireless access node and the plurality of UEs wirelessly exchange the communication traffic over the traffic channels in response to the control signaling.

3. The wireless access node of claim 1, wherein none of the signaling channels are allocated directly between the wireless access node and the one or more secondary UEs.

4. The wireless access node of claim 1, with the processing system further configured to determine whether the plurality of UEs are within a UE proximity threshold.

5. The wireless access node of claim 1, with the processing system further configured to, before selecting the hub UE, obtain UE proximities and compare the UE proximities to a predetermined proximity threshold, wherein the processing system configured to select the hub UE comprises the processing system configured to select the hub UE from among the plurality of UEs having the UE proximities that do not exceed the predetermined UE proximity threshold.

6. The wireless access node of claim 1, wherein the hub UE is selected according to one or more of being physically closest to the wireless access node, being substantially geographically centered among the plurality of UEs, being closest to the most other UEs, having the strongest signal, having the best S/N ratio, having the least interference, creating the least interference, or having the greatest available power overhead.

7. The wireless access node of claim 1, with the signaling load comprising one or more of a current number of UEs associated with the wireless access node, a current number of UEs communicating with the wireless access node, a signaling load quantification, an interference quantification, or a noise quantification.

8. The wireless access node of claim 1, with at least a portion of signaling being relayed via a signaling channel allocated between the wireless access node and the hub UE.

9. A method of operating a wireless access node of a wireless access network to aggregate signaling for a plurality of User Equipment (UE) devices (UEs), the method comprising:
   in the wireless access node, allocating traffic channels and signaling channels between the wireless access node and the plurality of UEs, wherein the wireless access node and the plurality of UEs wirelessly exchange control signaling over the signaling channels and communication traffic over the traffic channels, the control signaling being separate and distinct from the communication traffic;
   in the wireless access node, determining whether a signaling load associated with the control signaling exceeds a predetermined signaling load threshold;
   in the wireless access node, if the signaling load associated with the control signaling exceeds the predetermined signaling load threshold, then selecting a hub UE from among the plurality of UEs, with remaining UEs of the plurality of UEs comprising one or more secondary UEs;
   in the wireless access node, determining whether a carrier aggregation mode is active for the hub UE;
   in the wireless access node, if the carrier aggregation mode is not active for the hub UE, initiating the carrier aggregation mode for the hub UE by allocating multiple traffic channels of the traffic channels to the hub UE; and
   in the wireless access node, exchanging the communication traffic associated with the hub UE over at least one of the multiple traffic channels allocated to the hub UE, relaying all of the control signaling associated with the one or more secondary UEs through the hub UE via signaling aggregation using one or more of the multiple traffic channels allocated to the hub UE, and exchanging the communication traffic associated with the one or more secondary UEs over the traffic channels allocated to the one or more secondary UEs.

10. The method of claim 9, wherein the wireless access node and the plurality of UEs wirelessly exchange the communication traffic over the traffic channels in response to the control signaling.

11. The method of claim 9, wherein none of the signaling channels are allocated directly between the wireless access node and the one or more secondary UEs.

12. The method of claim 9, further comprising, in the wireless access node, determining whether the plurality of UEs are within a UE proximity threshold.

13. The method of claim 9, further comprising, before selecting the hub UE, obtaining UE proximities and comparing the UE proximities to a predetermined proximity threshold, wherein selecting the hub UE comprises selecting the hub UE from among the plurality of UEs having the UE proximities that do not exceed the predetermined UE proximity threshold.

14. The method of claim 9, wherein the hub UE is selected according to one or more of being physically closest to the wireless access node, being substantially geographically centered among the plurality of UEs, being closest to the most other UEs, having the strongest signal, having the best S/N ratio, having the least interference, creating the least interference, or having the greatest available power overhead.

15. The method of claim 9, with the signaling load comprising one or more of a current number of UEs associated with the wireless access node, a current number of UEs communicating with the wireless access node, a signaling load quantification, an interference quantification, or a noise quantification.

16. The method of claim 9, with at least a portion of signaling being relayed via a signaling channel allocated between the wireless access node and the hub UE.

17. One or more non-transitory computer-readable storage media having program instructions stored thereon that, when executed by a wireless access node, direct the wireless access node to at least:

allocate traffic channels and signaling channels between the wireless access node and a plurality of User Equipment (UE) devices (UEs), wherein the wireless access node and the plurality of UEs wirelessly exchange control signaling over the signaling channels and communication traffic over the traffic channels, the control signaling being separate and distinct from the communication traffic;

determine whether a signaling load associated with the control signaling exceeds a predetermined signaling load threshold;

if the signaling load associated with the control signaling exceeds the predetermined signaling load threshold, then select a hub UE from among the plurality of UEs, with remaining UEs of the plurality of UEs comprising one or more secondary UEs;

determining whether a carrier aggregation mode is active for the hub UE and if the carrier aggregation mode is not active for the hub UE, initiate the carrier aggregation mode for the hub UE by allocating multiple traffic channels of the traffic channels to the hub UE; and exchange the communication traffic associated with the hub UE over at least one of the multiple traffic channels allocated to the hub UE, relay all of the control signaling associated with the one or more secondary UEs through the hub UE via signaling aggregation using one or more of the multiple traffic channels allocated to the hub UE, and exchange the communication traffic associated with the one or more secondary UEs over the traffic channels allocated to the one or more secondary UEs.

18. The non-transitory computer-readable storage media of claim 17, wherein the wireless access node and the plurality of UEs wirelessly exchange the communication traffic over the traffic channels in response to the control signaling.

19. The non-transitory computer-readable storage media of claim 17, wherein none of the signaling channels are allocated directly between the wireless access node and the one or more secondary UEs.

20. The non-transitory computer-readable storage media of claim 17, with the wireless access node further configured to, before selecting the hub UE, obtain UE proximities and compare the UE proximities to a predetermined proximity threshold, wherein the program instructions, to direct the wireless access node to select the hub UE, direct the wireless access node to select the hub UE from among the plurality of UEs having the UE proximities that do not exceed the predetermined UE proximity threshold.

* * * * *